US006654957B1

(12) United States Patent
Moore et al.

(10) Patent No.: US 6,654,957 B1
(45) Date of Patent: Nov. 25, 2003

(54) REAL TIME DEVICE POLLING FOR MULTIPLEXED TRANSMISSION

(75) Inventors: Thomas E. Moore, Englewood, CO (US); Andrew W. Sundelin, Boulder, CO (US); Jeff Weaver, Englewood, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 09/426,969

(22) Filed: Oct. 26, 1999

(51) Int. Cl.[7] .............................................. H04N 7/173
(52) U.S. Cl. ....................... 725/111; 370/449; 370/458; 370/451
(58) Field of Search ................................ 370/346, 345, 370/449, 347, 350, 450, 451, 458; 725/111

(56) References Cited

U.S. PATENT DOCUMENTS

| 5,577,043 A | * | 11/1996 | Guo et al. ................... 370/449 |
| 5,745,837 A | * | 4/1998 | Fuhrmann .................... 725/114 |
| 5,805,586 A | * | 9/1998 | Perreault et al. ............. 370/346 |
| 5,818,828 A | * | 10/1998 | Packer et al. ................. 370/346 |
| 6,212,196 B1 | * | 4/2001 | Momona ...................... 370/449 |
| 6,308,328 B1 | * | 10/2001 | Bowcutt et al. ............. 725/111 |
| 6,453,472 B1 | * | 9/2002 | Leano et al. ................. 725/111 |

OTHER PUBLICATIONS

Thi et al. (USPub 2002/0061012) discloses cable modem with voice processing capability.*
DOCSI Specification SP–CMTRI–I01–970804, Aug. 1997, Cable modem telephony return interface specification.*
ITU–T J.112 (Mar. 1998), Transmission systems for interactive cable television services.*

* cited by examiner

Primary Examiner—Ricky Ngo
Assistant Examiner—Yvonne Q. Ha
(74) Attorney, Agent, or Firm—James R. Young (57) ABSTRACT

A real time device polling method for multiplexed transmission of on/off constant bit rate data, such as voice data from a telephone call, over a cable data network is disclosed. The network serves as a shared bus for both the downstream and upstream traffic. The upstream channel is modeled as a stream of mini-slots. A cable modem termination system at the head end supports a number of cable modems attached to the cable network and connected to customer premises equipment. Allocation maps are transmitted on the downstream channel to the cable modems to define transmission opportunities on the upstream channel. The cable modem termination system polls the cable modems in an efficient way such that the overhead associated with the polling is minimized, and the availability of data transmission slots is synchronized with the data packet generation by the codec for the cable modem, which minimizes delay.

29 Claims, 4 Drawing Sheets

REAL TIME DEVICE POLLING FOR MULTIPLEXED TRANSMISSION

FIELD OF THE INVENTION

This invention relates to cable television networks and more particularly to high-speed data communications over cable television networks. Even more particularly, the invention relates to real time device polling for high-speed data communications over cable television networks.

BACKGROUND OF THE INVENTION

Much research and development has been done in recent years in the cable television industry towards utilizing existing television cable networks for other purposes. Such purposes include telephone communications, accessing the Internet with personal computers, and other types of high-speed data communication. This interest is due in part to the broad bandwidth of cable television networks, the associated lower costs, and increased competition in the communications industry. Television cable networks may be all coaxial cable or hybrid-fiber/coax (HFC). This new bi-directional traffic over the television cable network can be statistically multiplexed with the existing traffic.

There are other advantages as well. Utilizing routing technologies and real time service over an Internet Protocol (IP) network, a telephone connected to a cable modem at the customer location can send voice data upstream over the television cable network to the cable network head end. At the cable network head end, the voice data received from the customer location can be connected to an IP backbone. Voice data is returned over the IP backbone to the cable network head end and back over the television cable network to the cable modem and telephone at the customer location. In a similar fashion a personal computer at the customer location, having a cable modem connecting it to the television cable network, can send data to the cable network head end, access the Internet, and receive data back from the cable network head end over the television cable through the cable modem to the personal computer.

Digital voice and video data can be characterized as a periodic constant bit rate (CBR) data source that is either on or off. To get the largest benefit from statistical multiplexing, when periodic CBR data, such as voice data from a telephone conversation, is in an off period, bandwidth needs to be allocated to some other service. However, voice data on periods are of variable length, and difficult to predict. Traditional approaches have required heavy overhead during off periods, where checking for bursts of voice data occurs, in order to reduce delay when an on period begins. This heavy overhead approach reduces statistical multiplexing gain. Delay must be minimized wherever it occurs because of the accumulated effects that delay has all along the communication path from end to end. Delay values in the 200 msec to 500 msec range, which are common in satellite telephone calls, are very noticeable.

It is thus apparent that there is a need in the art for an improved method or apparatus for transmitting periodic CBR data, such as voice data, over a television cable network which will maximize statistical multiplexing gain by minimizing overhead during voice data off periods, and yet respond quickly when a voice data on period begins in order to minimize delay. The present invention meets these and other needs in the art.

SUMMARY OF THE INVENTION

It is an aspect of the present invention to transmit periodic constant bit rate data, such as telephone voice data, over a television cable network.

It is another aspect of the invention to maximize statistical multiplexing of data on the television cable network by minimizing the overhead needed for checking for off periods associated with periodic constant bit rate data.

Yet another aspect of the invention is to quickly respond to on periods of constant bit rate data in order to minimize delay.

Still another aspect of the invention is to utilize real time device polling to detect the onset of on periods of constant bit rate data over a television cable network.

A further aspect of the invention is to tightly synchronize the real time device polling with requests to send constant bit rate data over a cable network in order to minimize delay.

The above and other aspects of the invention are accomplished in a television cable network that employs a Cable Modem Termination System (CMTS) at the head end. The CMTS supports multiple user locations, some of which have a cable modem attached between the television cable and customer premises equipment (CPE), such as a telephone or personal computer.

The television cable network serves as a shared bus for both the downstream and upstream traffic, having a tree-and-branch architecture with analog transmission. The upstream channel is modeled as a stream of mini-slots. A mini-slot is the unit of granularity for upstream transmission opportunities.

The cable modems are slaves that transmit data in a Time Division Multiple Access (TMDA) sense based on allocation maps. The allocation map describes, for some interval, how the upstream mini-slots may be used. A given allocation map may describe some slots as grants for particular cable modems to use in transmitting data, other slots as available for contention transmission, and other slots as an opportunity for new cable modems to join the link.

Once a cable modem is recognized on the cable network, it is allocated a request slot. The request slot allows the cable modem to request a longer time slot for data transmission. The CMTS receives the request from the cable modem in the request slot, and allocates, or grants, a longer time slot to the requesting cable modem for data transmission in the next map sent downstream.

The codec (coder-decoder), in the cable modem or external to the cable modem, or other CBR source, has a certain framing periodicity. The codec converts a received analog signal into digital signals, and packs these signals into frames, suitable for network transmission. The real time device polling of the present invention polls the cable modems in an efficient way such that the latency associated with media access is minimized. Thus, the polling process runs in parallel with the codec generation of frames.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
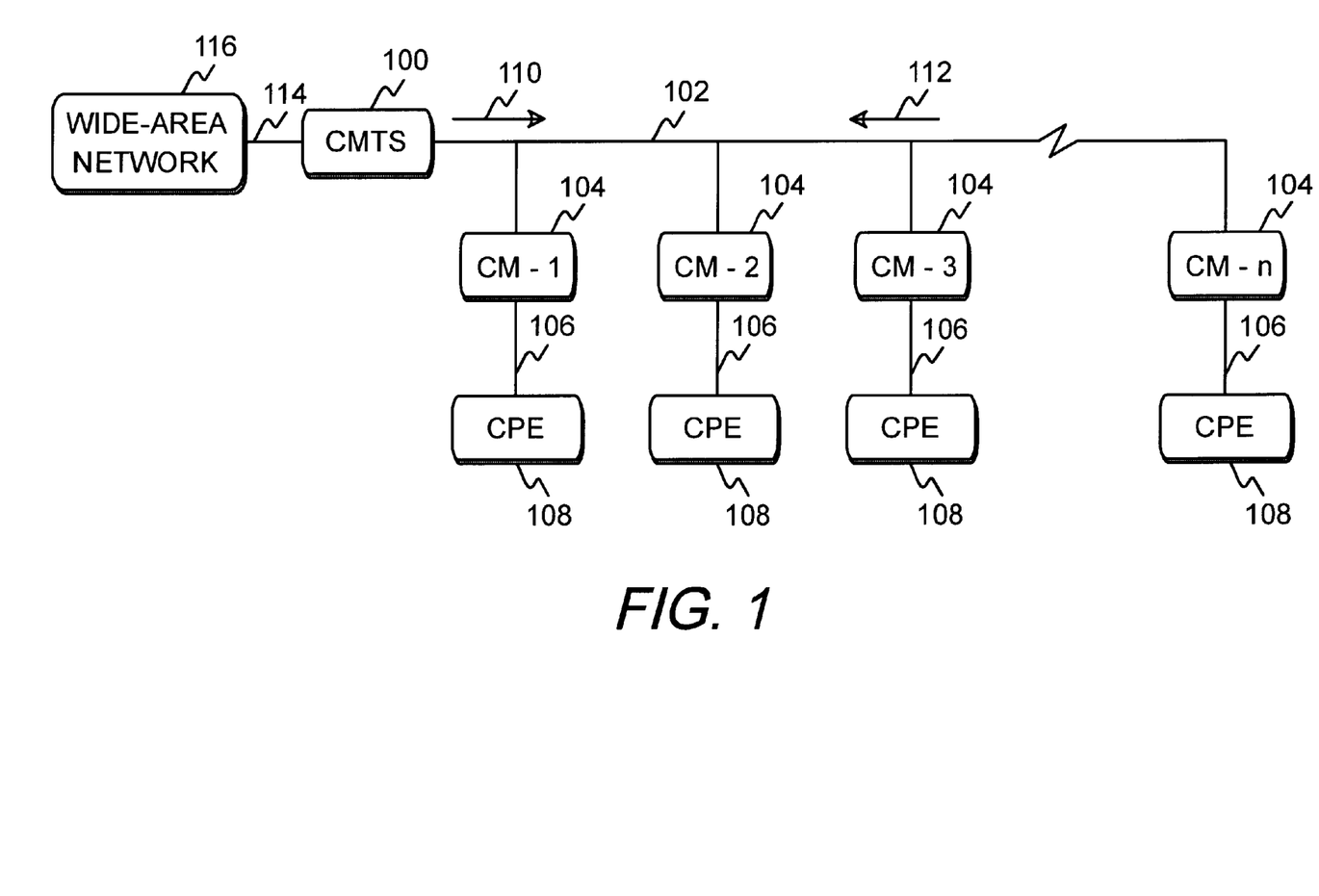
FIG. 1 shows a block diagram of a television cable network having a Cable Modem Termination System at the head end and multiple cable modems attached to the television cable network at various customer locations.

FIG. 1 shows a block diagram of a television cable network having a Cable Modem Termination System (CMTS) at the head end and multiple cable modems (CMs) attached to the television cable network at various customer locations. Referring now to FIG. 1, CMTS 100 contains the real time device polling method of the present invention and generates allocation maps (not shown in FIG. 1) for transmission over cable 102. The allocation maps are interleaved with other digital data in the downstream traffic flow, which is indicated by arrow 110. Upstream traffic flow is indicated by arrow 112. Cable 102 may be all coaxial cable or hybrid-fiber/coax (HFC), or any other communications means such as LDMS or satellite. Network-side interface 114 allows CMTS 100 to receive external signals from wide-area network 116, and also allows CMTS 100 to transmit signals to wide-area network 116.

Multiple cable modems 104 are connected to cable 102. In a typical situation, there may be thousands of subscribers served by cable 102, but at any given time only hundreds of active cable modems 104 are typically being served by CMTS 100. Customer interface 106 connects each cable modem 104 to Customer Premises Equipment (CPE) 108, which may be a telephone with a codec, or other constant bit rate (CBR) source with on and off periods, such as a personal computer, an interactive game, a video conference, a video stream, or some other device.

The allocation maps generated by CMTS 100 allocate a stream of mini-slots for use in the upstream traffic flow and carry information as to which cable modem 104 is to transmit data on time slot n, which cable modem 104 is to transmit data on time slot n+1, etc. Each cable modem 104 has a unique service identifier that is used to assign transmission slots to the cable modem. The service identifiers also provide classes of service management. Using this method, only one cable modem 104 is given the opportunity to transmit in a given time slot. Those can be opportunities to send a voice or video packet, a data packet, and/or to request additional bandwidth.

Figure 2:
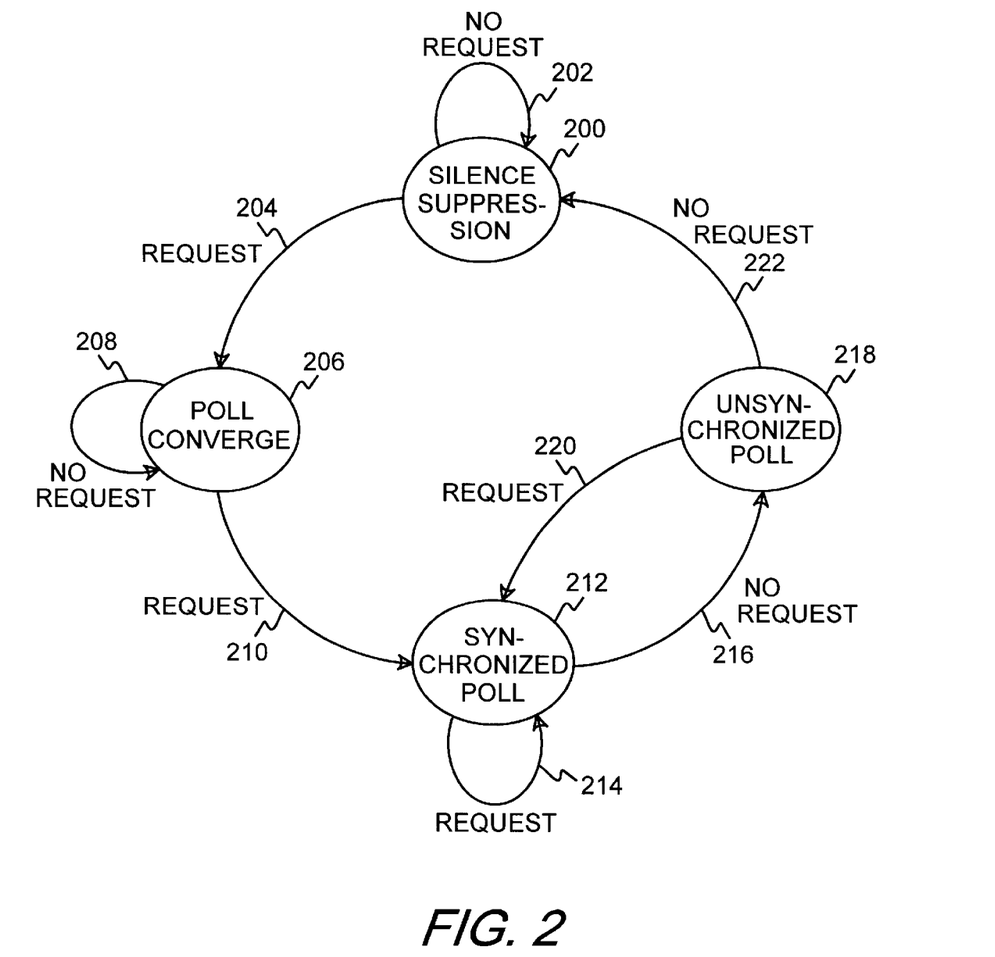
FIG. 2 shows a state transition diagram of the real time device polling of the present invention.

FIG. 2 shows a state transition diagram of the real time device polling of the present invention, which is contained within the CMTS 100 (FIG. 1). Referring now to FIG. 2, in silence suppression state 200 (during an off period of service), CMTS 100 polls the cable modems 104 (FIG. 1) at an infrequent rate, such as once every $T_1$ times, wherein $T_1$ is typically between 10 and 30 msec depending on the Codec. This polling allows any of the cable modems 104 to make a request to transmit data, such as voice data emanating from a user initiating a telephone call. In the preferred embodiment of the invention, the polling rate $T_1$ is equivalent to the voice codec framing rate. However, this rate can vary with the codec and end-to-end delay budgets.

CMTS 100 generates allocation maps on a periodic basis ($T_2$). In the preferred embodiment of the invention, $T_2 \leq T_1$, and CMTS 100 typically generates allocation maps at $T_2 = T_1/4$.

Since $T_2 \leq T_1$ not all cable modems are polled in each map. The multiple cable modems 104 may be grouped such that one group is polled beginning at time $T_1$ and thereafter at time $T_{1+}T_1$, $T_{1+}2T_1$, $T_{1+}3T_1$, etc. Another group may be polled beginning at time $T_2$ and thereafter at time $T_{2+}T_1$, $T_{2+}2T_1$, $T_{2+}3T_1$, etc. Arrow 202 represents that no request (i.e. a response to a poll) was detected by the current poll, and CMTS 100 remains in silence suppression state 200.

When a CPE 108 (FIG. 1), such as a telephone, is activated by a user and session begins, the codec for that CPE 108 begins generating data packets, according to its framing periodicity. The data packets are placed in a queue within the cable modem 104 that is attached to the CPE. Once data packet generation begins, cable modem 104 will send a request to transmit in the next poll that occurs. CMTS 100 then moves into poll convergence state 206, as shown in FIG. 2 by arrow 204.

When the CMTS 100 detects a request from cable modem 104, CMTS 100 does not know precisely when in the previous polling cycle the request for bandwidth was made, since the cable modem can only make a request when it is polled. The purpose of poll convergence state 206 is to synchronize the delivery of a poll and the generation of a packet, and bound the delay between the request for bandwidth and the subsequent polls to a smaller time frame. So, after the initial request, CMTS 100 begins to poll the requesting cable modem 104 at a lower period $T_3$ in order to gain closer synchronization. In the preferred embodiment of the invention, the poll frequency is increased from $T_1$ to every $T_1/4$. Thus, CMTS 100 can determine, with a minimum of one additional poll up to a maximum of 3 additional polls, the periodicity to within $T_1/4$ from when the cable modem 104 is generating packets, as more fully explained in FIGS. 3, 4A, and 4B, described below.

Arrow 208 indicates no request was detected by the current poll, and CMTS 100 remains in, poll convergence state 206. CMTS 100 may have to send up to three more polls at $T_3$ intervals before detecting the next request for bandwidth from cable modem 104, which is represented by arrow 210. Once the request for bandwidth is detected, CMTS 100 moves to synchronized poll state 212.

In synchronized poll state 212, CMTS 100 resumes polling at a higher period $T_4$, which in the preferred embodiment of the invention is equal to $T_1$, since polling and requests are now in synchronization within $T_3$. The codec for cable modem 104 is converting data for $T_1$ and placing the data packet generated in the queue. When the next transmit opportunity arrives, the data packet in the queue is transmitted.

CMTS 100 remains in synchronized poll state 212 as long as each poll detects a request, indicated by arrow 214. When a poll does not detect a request, represented by arrow 216, CMTS 100 moves to un-synchronized poll state, 218. There are two possibilities for the no request occurring. First, there is no more data to transmit due to a pause or period of silence in the session, or due to termination of the telephone call. Second, "slippage" could have occurred.

Though CMTS 100 is polling on strict intervals, in reality the polling interval ($T_4$) may vary slightly up or down. Similarly, on the codec side, the framing interval will vary up or down from the desired interval. This is especially true if the codec is not in the modem, but in a personal computer or some external component. Because these two timing loops are out of phase, there can be a gradual migration or slippage where a request will approach the polling time and eventually slip into the next succeeding polling time, as more fully explained in FIGS. 4A and 4B. Thus, CMTS 100 must determine if cessation of data (i.e. an off period) or slippage has occurred.

If slippage has occurred, then providing an opportunity to cable modem 104 to transmit quickly by increasing the polling frequency can restore synchronization. In the preferred embodiment of the invention, in un-synchronized poll state 218 a poll is sent at time $T_3$ after the no request of arrow 216 was detected. If the no request of arrow 216 was due to slippage, then there will be another request detected by the next poll, represented by arrow 220, which moves CMTS 100 back to synchronized poll state 212, where polling resumes at a lower frequency, again offset by time $T_3$. In the preferred embodiment of the invention, the lower frequency is once every 20 msec.

If, however, there is no request detected by the next poll, represented by arrow 222, then transmission of data has ceased (i.e. an off period), and CMTS 100 moves into silence suppression state 200 and the polling frequency is lowered. Typically, the higher period is once every $T_1$. Without un-synchronized poll state 218, if the no request of arrow 216 was due to slippage, then CMTS would go from being very close in synchronization to being very far out of synchronization.

Figure 3:
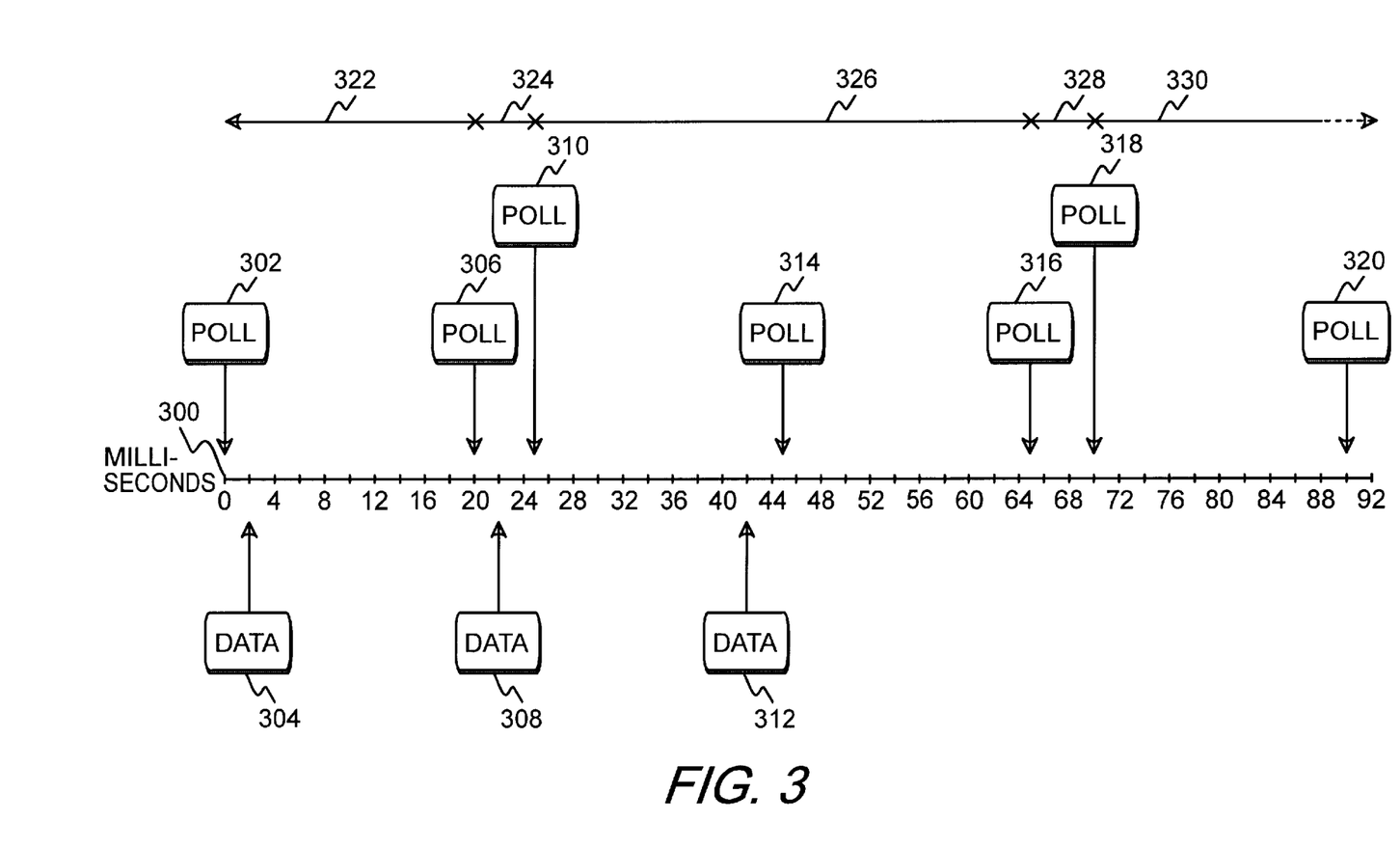
FIG. 3 shows a time line of the real time device polling of a cable modem that starts and stops sending periodic constant bit rate data.

FIG. 3 shows a time line of the real time device polling of a cable modem that starts and stops sending periodic constant bit rate data. Referring now to FIG. 3, time line 300 is demarcated in milliseconds. CMTS 100 initially polls one of the cable modems 104 (FIG. 1) at time 0, represented by poll 302. Since no request was detected in time previous to time 0, CMTS 100 is in silence suppression state 200 (FIG. 2). At time 2, cable modem 104 generates a data packet to transmit, represented by data 304, which is placed in a queue within cable modem 104. CMTS 100 polls cable modem 104 again at time 20, represented by poll 306. From time 0 to time 20, CMTS 100 is in silence suppression state 200 (FIG. 2), represented by arrow 322.

At poll 306, CMTS 100 detects the request to transmit that resulted from data 304, and allocates bandwidth by granting a transmit opportunity in the next map sent for cable modem 104. When cable modem 104 receives the next map, it scans the map for its data grant, and then transmits data 304, which is received in the second map, so that data 304 arrives at CMTS 100 at the proper time. Beginning at time 20, CMTS 100 is in poll convergence state 206 (FIG. 2).

At time 22, cable modem 104 generates the next data packet to transmit, represented by data 308, which is placed in the queue within cable modem 104. CMTS 100 polls cable modem 104 again at time 25, represented by poll 310. CMTS 100 at poll 310 now detects the request to transmit from data 308, and allocates bandwidth by granting a transmit opportunity in the next map sent for cable modem 104. When cable modem 104 receives the next map, it scans the map for its data grant, and then transmits data 308, which is received in the next map, so that data 308 arrives at CMTS 100 at the proper time. From time 20 to time 25, CMTS 100 is in poll convergence state 206, represented by arrow 324. At time 25, CMTS 100 moves from poll convergence state 206 into synchronized poll state 212 (FIG. 2).

At time 42, cable modem 104 generates the next data packet to transmit, represented by data 312, which is placed in the queue within cable modem 104. CMTS 100 polls cable modem 104 again at time 45, represented by poll 314. CMTS 100 at poll 314 now detects the request to transmit from data 312, and allocates bandwidth by granting a transmit opportunity in the next map sent for cable modem 104. When cable modem 104 receives the next map, it scans the map for its data grant, and then transmits data 312, which is received in the next map, so that data 312 arrives at CMTS 100 at the proper time.

CMTS 100 polls cable modem 104 again at time 65, represented by poll 316. CMTS 100 at poll 316 does not detect a request to transmit from cable modem 104. From time 25 to time 65, CMTS 100 is in synchronized poll state 212, represented by arrow 326. At time 65, CMTS 100 moves from synchronized poll state 212 into unsynchronized poll state 218 (FIG. 2) to determine if slippage or cessation of data has occurred.

CMTS 100 polls cable modem 104 again at time 70, represented by poll 318. CMTS 100 at poll 318 does not detect a request to transmit from cable modem 104. From time 65 to time 70, CMTS 100 is in un-synchronized poll state 218, represented by arrow 328. At time 70, CMTS 100 moves from un-synchronized poll state 218 into silence suppression state 200, represented by arrow 330, and will remain in this state until a next request to transmit is detected.

Figure 4A:
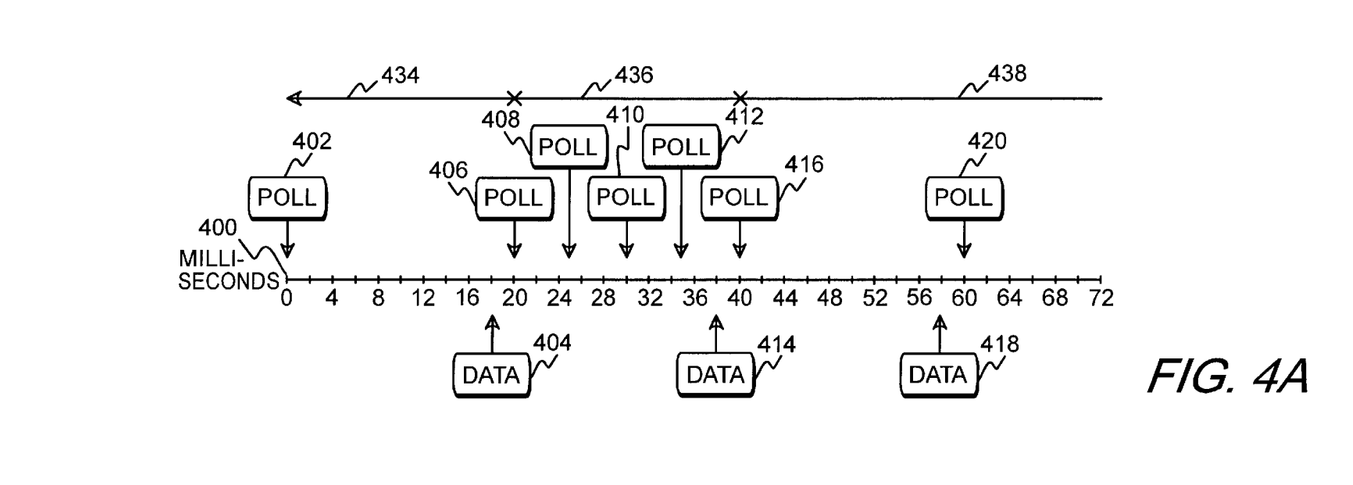
FIGS. 4A and 4B show a time line of the real time device polling of a cable modem that starts sending periodic constant bit rate data and then experiences slippage.
Figure 4B:
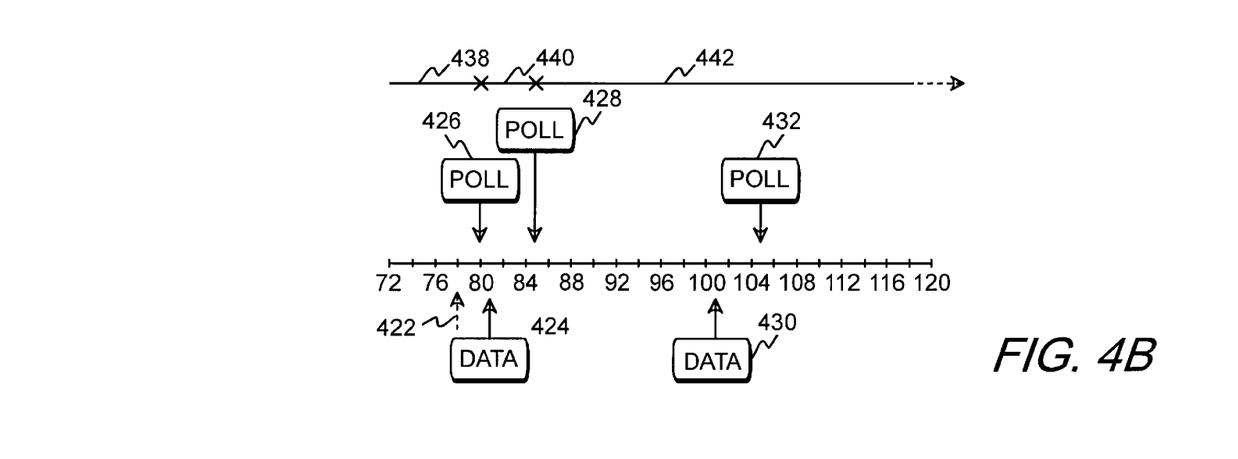

FIGS. 4A and 4B show a time line of the real time device polling of a cable modem that starts sending periodic constant bit rate data and then experiences slippage. FIG. 4B is a continuation of the time line of FIG. 4A. Referring now to FIGS. 4A and 4B, time line 400 is demarcated in milliseconds. CMTS 100 (FIG. 1) initially polls one of the cable modems 104 at time 0, represented by poll 402. Since no request was detected in time previous to time 0, CMTS 100 is in silence suppression state 200 (FIG. 2). At time 18, cable modem 104 generates a data packet to transmit, represented by data 404, which is placed in a queue within cable modem 104. CMTS 100 polls cable modem 104 again at time 20, represented by poll 406. From time 0 to time 20, CMTS 100 is in silence suppression state 200, represented by arrow 434. Beginning at time 20, CMTS 100 is in poll convergence state 206 (FIG. 2).

CMTS 100 at poll 406 now detects the request to transmit from data 404, and allocates bandwidth by granting a transmit opportunity in the next map for cable modem 104. When cable modem 104 receives the next map, it scans the map for its data grant, and then transmits data 404, which is received in the next map, so that data 404 arrives at CMTS 100 at the proper time.

CMTS 100 polls cable modem 104 again at time 25, represented by poll 408. No request for transmission is detected by poll 408 since the previous poll 406. CMTS 100 polls cable modem 104 again at time 30, represented by poll 410. No request for transmission is detected by poll 410 since the previous poll 408. CMTS 100 polls cable modem 104 again at time 35, represented by poll 412. No request for transmission is detected by poll 412 since the previous poll 410.

At time 38, cable modem 104 generates the next data packet to transmit, represented by data 414, which is placed in the queue within cable modem 104. CMTS 100 polls cable modem 104 again at time 40, represented by poll 416, detects the request to transmit from data 414, and allocates bandwidth by granting a transmit opportunity in the next map for cable modem 104. When cable modem 104 receives the next map, it scans the map for its data grant, and then transmits data 414, which is received in the next map, so that data 414 arrives at CMTS 100 at the proper time. From time 20 to time 40, CMTS 100 is in poll convergence state 206, represented by arrow 436. At time 40, CMTS 100 moves from poll convergence state 206 into synchronized poll state 212 (FIG. 2).

At time 58, cable modem 104 generates the next data packet to transmit, represented by data 418, which is placed in the queue within cable modem 104. CMTS 100 polls cable modem 104 again at time 60, represented by poll 420. CMTS 100 at poll 420 detects the request to transmit from data 418, and allocates bandwidth by granting a transmit opportunity in the next map for cable modem 104. When cable modem 104 receives the next map, it scans the map for its data grant, and then transmits data 418, which is received in the next map, so that data 312 arrives at CMTS 100 at the proper time.

CMTS 100 polls cable modem 104 again at time 80, represented by poll 426. CMTS 100 at poll 426 does not detect a request to transmit from cable modem 104. From time 40 to time 80, CMTS 100 is in synchronized poll state 212, represented by arrow 438. At time 80, CMTS 100 moves from synchronized poll state 212 into unsynchronized poll state 218 (FIG. 2) to determine if slippage or cessation of data has occurred.

At time 81, cable modem 104 generates the next data packet to transmit, represented by data 424, which is placed in the queue within cable modem 104. Data 424 was expected to be generated at time 78, represented by dashed arrow 422. But due to slippage, which is caused by the allocation map generation timing loop being out of phase with the codec framing generation timing loop, data 424 has slipped in time past poll 426. One skilled in the art will recognize that slippage occurs gradually over time, and not as abruptly as shown for simplicity in FIG. 4B. Each data packet generated is slightly out of sync with the polling frequency and slippage eventually occurs.

From time 80 to time 85, CMTS 100 is in un-synchronized poll state 218, represented by arrow 440. At time 85, CMTS 100 moves from un-synchronized poll state 218 back into synchronized poll state 212, represented by arrow 440.

CMTS 100 polls cable modem 104 again at time 85, represented by poll 428. CMTS 100 at poll 428 detects the request to transmit from data 424, and allocates bandwidth by granting a transmit opportunity in the next map for cable modem 104. When cable modem 104 receives the next map, it scans the map for its data grant, and then transmits data 424, which is received in the next map, so that data 424 arrives at CMTS 100 at the proper time.

At time 101, cable modem 104 generates the next data packet to transmit, represented by data 430, which is placed in the queue within cable modem 104. CMTS 100 polls cable modem 104 again at time 105, represented by poll 432. CMTS 100 at poll 432 detects the request to transmit from data 430, and allocates bandwidth by granting a transmit opportunity in the next map for cable modem 104. When cable modem 104 receives the next map, it scans the map for its data grant, and then transmits data 430, which is received in the next map, so that data 430 arrives at CMTS 100 at the proper time. CMTS 100 will remain in synchronized poll state 212, represented by arrow 442, until cessation of data or slippage is detected.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. In a telecommunications system supporting polled communications, a polling method comprising the steps of:
   (a) transmitting a polling signal at a first periodic rate;
   (b) receiving a response, from a first polled device, to said polling signal transmitted in step (a);
   (c) increasing said transmitting said polling signal to said first polled device from which a response was received in step (b), from said first periodic rate to a second periodic rate, wherein said second periodic rate causes polling to occur more frequently than said first periodic rate;
   (d) receiving a second response from said first polled device;
   (e) decreasing said transmitting said polling signal to said first polled device to a third periodic rate, wherein said third periodic rate causes polling to occur less frequently than said second period rate.

2. The telecommunications system of claim 1 wherein said third periodic rate is equal to said first periodic rate.

3. The telecommunications system of claim 1 further comprising the steps of:
   (f) when no response is received from said first polled device to a transmitted polling signal before a subsequent poll signal is transmitted, increasing said transmitting said polling signal to said first polled device, from said third periodic rate to a fourth periodic rate, wherein said fourth periodic rate causes polling to occur more frequently than said third periodic rate;
   (g) receiving a response from said first polled device to a polling signal sent in step (f);
   (h) decreasing said transmitting said polling signal to said first polled device to a fifth periodic rate, wherein said fifth periodic rate causes polling to occur less frequently than said fourth period rate.

4. The telecommunications system of claim 3 wherein said first, third and fifth periodic rates are the same.

5. The telecommunications system of claim 3 wherein said second and fourth period rates are the same.

6. A real time device polling method for multiplexed transmission over a cable network, said method comprising the steps of:
   (a) generating, by at least one cable modem at a periodic rate, a plurality of data packets from data received from a customer premises equipment connected to said at least one cable modem;
   (b) polling at a first polling rate, by a cable modem termination system at a head end of said cable network, said at least one cable modem connected to said cable network, wherein said polling further comprises sending a plurality of allocation maps at an allocation map frequency;
   (c) when said at least one cable modem receives one of said plurality of allocation maps from said polling, after generating a first of said plurality of data packets, requesting by said at least one cable modem a first transmit opportunity in a request slot within said one of said plurality of allocation maps;
   (d) when said cable modem termination system receives said request for said first transmit opportunity in said request slot in said one of said plurality of allocation maps,
      (d1) granting said first transmit opportunity for said at least one cable modem in a first grant allocation map from said plurality of allocation maps from said polling, and (d2) polling said at least one cable modem at a second polling rate, wherein said second polling rate is more frequent than said first polling rate;

(e) when said at least one cable modem receives said first grant allocation map, transmitting said first of said plurality of data packets, (f) when said at least one cable modem receives another one of said plurality of allocation maps from said polling, after generating a second of said plurality of data packets, requesting by said at least one cable modem a second transmit opportunity in a request slot within said another one of said plurality of allocation maps;

(g) when said cable modem termination system receives said request for said second transmit opportunity in said request slot in said another one of said plurality of allocation maps, (g1) granting said second transmit opportunity for said at least one cable modem in a second grant allocation map, and (g2) polling said at least one cable modem at a third polling rate, wherein said third polling rate is less frequent than said second polling rate; and (h) when said at least one cable modem receives said second grant allocation map, transmitting said second of said plurality of data packets.

7. A real time device polling method for multiplexed transmission over a cable network according to claim 6 further comprising the step of:

(i) repeating steps (f), (g), and (h) for said plurality of allocation maps and said plurality of data packets for a plurality of requests from said at least one cable modem for a plurality of transmit opportunities in a plurality of request slots within said plurality of allocation maps while polling said at least one cable modem at said third polling rate.

8. A real time device polling method for multiplexed transmission over a cable network according to claim 7 further comprising the steps of:

(j) when said cable modem termination system fails to receive a next request from said polling of said at least one cable modem for a next transmit opportunity in a next request slot in a next allocation map, polling said at least one cable modem at a fourth polling rate, wherein said fourth polling rate is more frequent than said third polling rate; and (k) when said cable modem termination system fails to receive another next request immediately after step (j) from said polling of said at least one cable modem for a next transmit opportunity in a next request slot in a next allocation map, polling said at least one cable modem at a fifth polling rate, wherein said fifth polling rate is less frequent than said fourth polling rate.

9. A real time device polling method for multiplexed transmission over a cable network according to claim 8 wherein step (k) is replaced by the following new step (k):

(k) when said cable modem termination system receives another next request immediately after step (j) from said polling of said at least one cable modem for a next transmit opportunity in a next request slot in a next allocation map, (k1) granting said next transmit opportunity for said at least one cable modem in a next grant allocation map, and (k2) polling said at least one cable modem at a fifth polling rate, wherein said fifth polling rate is less frequent than said fourth polling rate.

10. A real time device polling method for multiplexed transmission over a cable network according to claim 8 wherein said first polling rate, said third polling rate, and said fifth polling rate are the same.

11. A real time device polling method for multiplexed transmission over a cable network according to claim 8 wherein said second polling rate and said fourth polling rate are the same.

12. A real time device polling method for multiplexed transmission over a cable network according to claim 6 wherein said allocation map frequency is a sub-multiple of said first polling rate.

13. A real time device polling method for multiplexed transmission over a cable network according to claim 6 wherein said periodic rate for said generation of said plurality of data packets has an integer relationship with said first polling rate.

14. A real time device polling method for multiplexed transmission over a cable network according to claim 13 wherein said periodic rate for said generation of said plurality of data packets is the same as said first polling rate.

15. A real time device polling method for multiplexed transmission over a cable network according to claim 6 wherein a first group of cable modems are polled by said cable modem termination system at said first polling rate starting at a first time, and a second group of cable modems are polled by said cable modem termination system at said first polling rate starting at a second time.

16. A real time device polling method for multiplexed transmission over a cable network according to claim 6 wherein said customer premises equipment is a telephone.

17. A real time device polling method for multiplexed transmission over a cable network according to claim 6 wherein said customer premises equipment is a personal computer.

18. A cable network for transmitting constant bit rate data comprising:

a plurality of cable modems connected to said cable network, wherein each of said plurality of cable modems generates a plurality of data packets at a periodic rate for transmission upstream over said cable network;

a plurality of customer premises equipment, wherein each of said plurality of customer premises equipment is connected to one of said plurality of cable modems through a customer interface, wherein each of said plurality of customer premises equipment generates said constant bit rate data, wherein said constant bit rate data is transferred over said customer interface to each of said plurality of cable modems; and a cable modem termination system connected to a head end of said cable network, wherein said cable modem termination system polls said plurality of cable modems at a first polling rate, and further wherein when said polling indicates to said cable modem termination system that one of said plurality of cable modems has requested a first transmit opportunity to transmit at least one data packet, allocating bandwidth by said cable modem termination system for said first transmit opportunity for said one of said plurality of cable modems, and polling by said cable modem termination system said one of said plurality of cable modems at a second polling rate, wherein said second polling rate is more frequent than said first polling rate, and further wherein when said polling at said second polling rate indicates to said cable modem termination system that said one of said plurality of cable modems has requested a second transmit opportunity to transmit at least one other data packet, allocating bandwidth by said cable modem termination system for said second transmit opportunity for said one of said plurality of cable modems, and polling by said cable modem termination system said one of said plurality of cable modems at a third polling rate, wherein said third polling rate is less frequent than said second polling rate.

19. A cable network for transmitting constant bit rate data according to claim 18 wherein when said cable modem termination system fails to receive a next request for a next transmit opportunity to transmit a next data packet from said polling of said one of said plurality of cable modems, polling by said cable modem termination system said one of said plurality of cable modems at a fourth polling rate, wherein said fourth polling rate is more frequent than said third polling rate, and further wherein when said cable modem termination system fails to receive another next request for another next transmit opportunity to transmit another next data packet immediately after said failure to receive said next request for said next transmit opportunity from said polling of said one of said plurality of cable modems, polling by said cable modem termination system said at least one cable modem at a fifth polling rate, wherein said fifth polling rate is less frequent than said fourth polling rate.

20. A cable network for transmitting constant bit rate data according to claim 19 wherein said first polling-rate, said third polling rate, and said fifth polling rate are the same.

21. A cable network for transmitting constant bit rate data according to claim 19 wherein said second polling rate and said fourth polling rate are the same.

22. A cable network for transmitting constant bit rate data according to claim 18 wherein when said cable modem termination system fails to receive a next request for a next transmit opportunity to transmit a next data packet from said polling of said one of said plurality of cable modems, polling by said cable modem termination system said one of said plurality of cable modems at a fourth polling rate, wherein said fourth polling rate is more frequent than said third polling rate, and further wherein when said cable modem termination system receives another next request for another next transmit opportunity to transmit another next data packet immediately after said failure to receive said next request for said next transmit opportunity from said polling of said one of said plurality of cable modems, allocating bandwidth by said cable modem termination system for said another next transmit opportunity for said one of said plurality of cable modems, and polling by said cable modem termination system said at least one cable modem at a fifth polling rate, wherein said fifth polling rate is less frequent than said fourth polling rate.

23. A cable network for transmitting constant bit rate data according to claim 18 further comprising:
   a network-side interface connected to said cable modem termination system; and
   a wide-area network connected to said network-side interface, wherein said network-side interface allows said cable modem termination system to receive external signals from said area network, and further wherein said network-side interface allows said cable modem termination system to transmit signals to said wide-area network.

24. A cable network for transmitting constant bit rate data according to claim 18 wherein said polling further comprises transmitting by said cable modem termination system a plurality of allocation maps at an allocation map frequency.

25. A cable network for transmitting constant bit rate data according to claim 24 wherein said allocation map frequency is a sub-multiple of said first polling rate.

26. A cable network for transmitting constant bit rate data according to claim 18 wherein said periodic rate for said generation of said plurality of data packets has a substantially integer relationship with said first polling rate.

27. A cable network for transmitting constant bit rate data according to claim 26 wherein said periodic rate for said generation of said plurality of data packets is the same as said first polling rate.

28. A cable network for transmitting constant bit rate data according to claim 18 wherein said customer premises equipment is a telephone.

29. A cable network for transmitting constant bit rate data according to claim 18 wherein said customer premises equipment is a personal computer.

* * * * *